United States Patent [19]
Kaneda et al.

[11] Patent Number: 5,574,559
[45] Date of Patent: Nov. 12, 1996

[54] DISPLACEMENT DETECTION APPARATUS USING MULTIPLE DISPLACEMENT DETECTION SIGNALS FORMED BY A MULTIPLE PHASE COMBINATION GRATING

[75] Inventors: Yasushi Kaneda, Tokyo; Koh Ishizuka, Ohmiya; Hiroshi Kondo, Yokohama; Satoshi Ishii, Tokyo, all of Japan

[73] Assignee: Canon Kabushiki Kaisha, Tokyo, Japan

[21] Appl. No.: 608,029

[22] Filed: Feb. 28, 1996

Related U.S. Application Data

[63] Continuation of Ser. No. 172,052, Dec. 23, 1993, abandoned.

[30] Foreign Application Priority Data

Dec. 28, 1992  [JP]  Japan .................... 4-347414

[51] Int. Cl.⁶ .................................................. G01B 9/02
[52] U.S. Cl. ................................ 356/356; 250/237 G
[58] Field of Search ............................. 356/356, 363; 250/237 G, 231.14, 231.16

[56] References Cited

U.S. PATENT DOCUMENTS

| | | |
|---|---|---|
| 4,176,276 | 11/1979 | Kaul et al. . |
| 4,766,310 | 8/1988 | Michel . |
| 4,912,322 | 3/1990 | Ichikawa .................... 250/237 G |
| 4,930,895 | 6/1990 | Nishimura et al. . |
| 4,933,673 | 6/1990 | Ishizuka et al. . |
| 4,975,570 | 12/1990 | Nishimura et al. . |
| 4,979,826 | 12/1990 | Ishizuka et al. . |
| 5,000,572 | 3/1991 | Nose et al. ................... 356/356 |
| 5,026,164 | 6/1991 | Ichikawa . |
| 5,026,985 | 6/1991 | Ishizuka et al. . |
| 5,038,491 | 8/1991 | Tsukiji et al. . |
| 5,051,579 | 9/1991 | Tsukiji et al. . |
| 5,146,085 | 9/1992 | Ishizuka et al. . |
| 5,159,192 | 10/1992 | Nishimura et al. . |
| 5,216,478 | 6/1993 | Kadowaki et al. . |
| 5,249,032 | 9/1993 | Matsui et al. ................ 356/356 |
| 5,500,734 | 3/1996 | Spanner ....................... 356/356 |

FOREIGN PATENT DOCUMENTS

| | | |
|---|---|---|
| 0163362 | 12/1985 | European Pat. Off. . |
| 0223009 | 5/1987 | European Pat. Off. . |
| 0463561 | 1/1992 | European Pat. Off. . |
| 2653545 | 5/1978 | Germany . |
| 62-121314 | 6/1987 | Japan . |
| 1-180615 | 12/1989 | Japan . |
| 2-262064 | 10/1990 | Japan . |
| 2247313 | 2/1992 | United Kingdom . |
| WO8603833 | 7/1986 | WIPO . |
| WO8707944 | 12/1987 | WIPO . |

*Primary Examiner*—Samuel A. Turner
*Attorney, Agent, or Firm*—Fitzpatrick, Cella, Harper & Scinto

[57] ABSTRACT

A displacement detection apparatus has a light source 1, a first diffraction grating G1 for diffracting and dividing the light from the light source and applying O-order diffracted light and +1st-order diffracted light to a second diffraction grating G2, a third diffraction grating G3 for combining +1st-order reflected diffracted light created by the O-order diffracted light being reflected and diffracted by the second diffraction grating and −1st-order reflected diffracted light created by the +1st-order diffracted light being diffracted by the second diffraction grating, to thereby form interference light, and a light receiving element 3 for photoelectrically converting the interference light, the third diffraction grating including four diffraction gratings given a phase difference of π/2 each, the light receiving element being provided with light receiving portions 3a1, 3a2, 3b1 and 3b2 corresponding to the four diffraction gratings of the third diffraction grating, and cruciform light intercepting means is provided between adjacent ones of the light receiving portions.

22 Claims, 10 Drawing Sheets

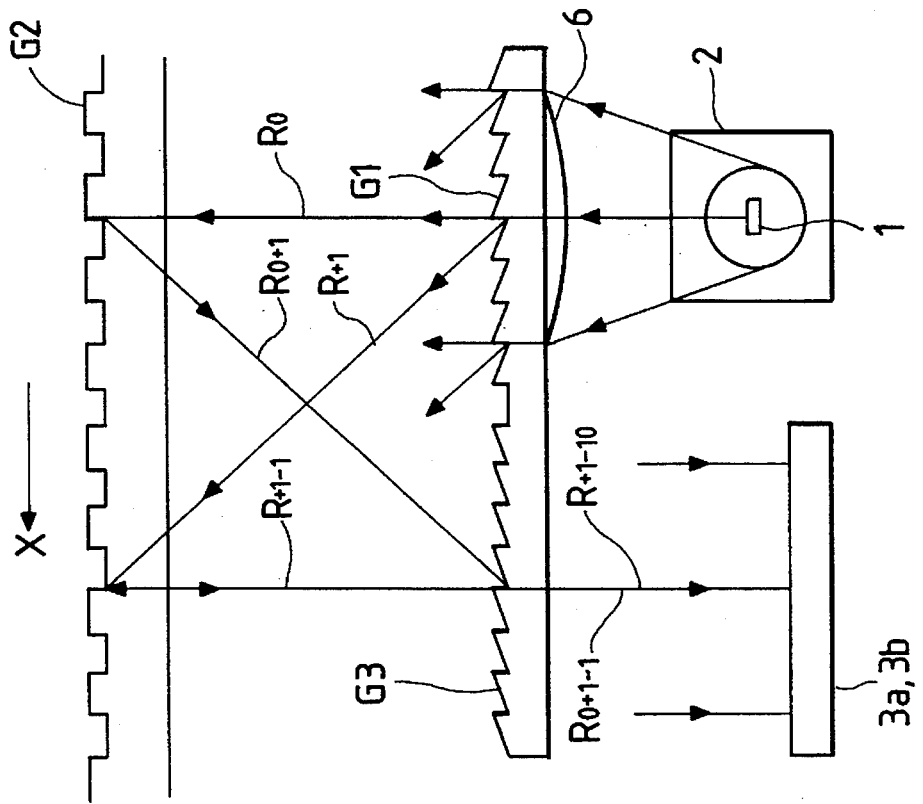
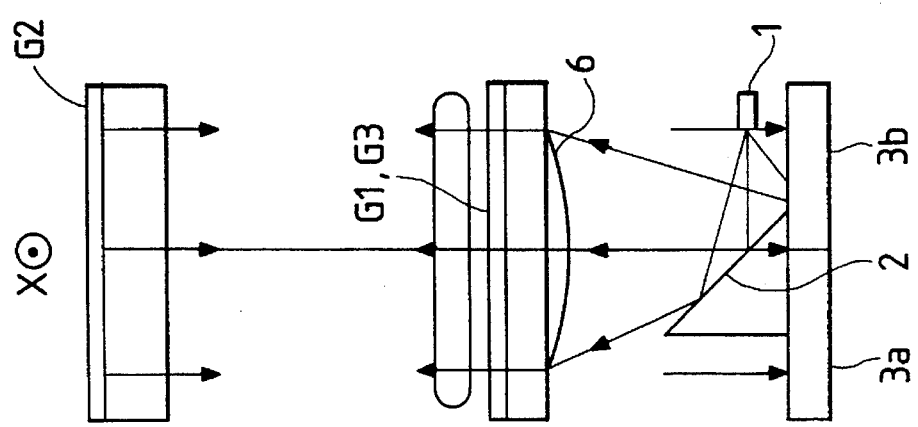

DISPLACEMENT DETECTION APPARATUS USING MULTIPLE DISPLACEMENT DETECTION SIGNALS FORMED BY A MULTIPLE PHASE COMBINATION GRATING

This application is a continuation of application Ser. No. 08/172,062, filed Dec. 23, 1993, now abandoned.

BACKGROUND OF THE INVENTION

1. Field of the Invention

This invention relates to an apparatus for optically detecting the displacement (amount of movement, amount of rotation, speed and acceleration) of an object, and specifically to an encoder, a speed sensor, an acceleration sensor or the like.

2. Related Background Art

Optical displacement sensors for directing light to an object and detecting the displacement of the object highly accurately, for example, optical type encoders, laser Doppler velocity meters, laser interferometers, etc. are widely utilized in the fields of NC machine tools, OA instruments, robots, precision manufacturing apparatuses, etc.

One of these displacement sensors is a high resolving power sensor using interference light having the displacement information of an object to be inspected.

At present, as the displacement sensor using said interference light, there is required one which can stably obtain displacement detection signals of two or more differing phases.

SUMMARY OF THE INVENTION

The displacement detection apparatus of a first preferred embodiment of the present invention is provided with means for combining a first beam and a second beam and light receiving means for receiving an interference beam formed by the combination of the first and second beams, the combining means being provided with first to fourth diffraction gratings differing in phase by 90° each, the light receiving means being provided with first to fourth light receiving portions for individually receiving portions of the interference beam obtained through the first to fourth diffraction gratings.

The displacement detection apparatus of a second preferred embodiment of the present invention is provided with means for applying to a diffraction grating two beams obtained by dividing a radiation beam, means for combining a first diffracted beam created from a diffraction grating by the application of one of the beams and a second diffracted beam created from the diffraction grating by the application of the other beam, and light receiving means for receiving an interference beam formed by the combination of the first and second diffracted beams and converting it into a signal indicative of the displacement of the diffraction grating, the combining means being provided with first to fourth diffraction gratings differing by 90° each in phase, said light receiving means being provided with first to fourth light receiving portions for discretely receiving portions of said interference beam obtained through said first to fourth diffraction gratings, thereby meeting the above-noted requirement.

The light receiving means of the present invention receives only said first and second diffracted lights and divides a substantially single interference light into a plurality of lights and converts them into signals to thereby obtain a plurality of signals differing exactly by a predetermined amount in phase from one another.

BRIEF DESCRIPTION OF THE DRAWINGS

FIGS. 2A and 2B illustrate the first embodiment of the present invention, FIG. 2A being a front view, and FIG. 2B being a side view.

DETAILED DESCRIPTION OF THE PREFERRED EMBODIMENTS

Figure 1:
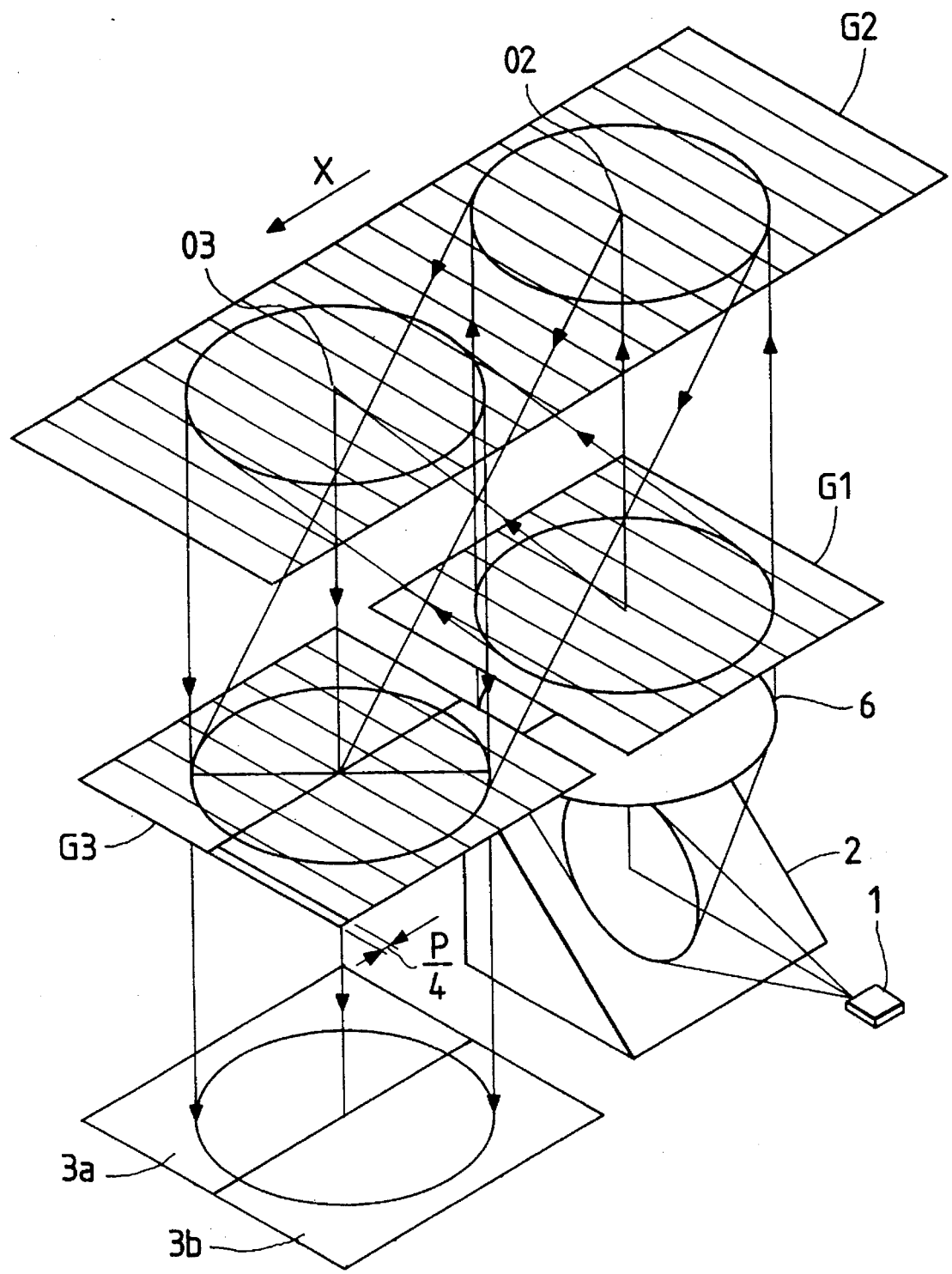
FIG. 1 is a schematic view showing a first embodiment of the present invention.

FIG. 1 is a schematic view showing a first embodiment of the present invention, and FIGS. 2A and 2B are a front view and a side view, respectively, of the apparatus of FIG. 1.

Numeral 1 designates a light emitting element such as a semiconductor laser or an LED, numeral 2 denotes a bending mirror, the reference characters 3a and 3b designate light receiving elements for photoelectrically converting interference light to thereby output displacement detection signals, the reference character G1 denotes a first diffraction grating for dividing a light beam, the reference character G2 designates a second diffraction grating as a scale displaceable in the x direction, and the reference character G3 denotes a third diffraction grating for combining two light beams from the second diffraction grating G2, and having a grating surface parallel to the grating surfaces of the first and second diffraction gratings G1, G2. Numeral 6 designates a collimator lens for collimating the divergent light from the light emitting element 1. The collimator lens 6 is formed integrally with the diffraction grating G1. The letter P denotes the grating pitch of the third diffraction grating G3. The divergent light beam emitted from the light emitting element 1 has its way bent by the mirror 2, is made into a parallel light beam R by the lens 6, enters the first diffraction grating G1, is transmissively diffracted by the first diffraction grating G1, and is divided into 0-order diffracted light R0, +1st-order diffracted light R+1 and −1st-order diffracted light (not shown) and emerges therefrom.

The light beam R0 which has rectilinearly travelled through the diffraction grating G1 is reflectively diffracted at a point O2 on the second diffraction grating G2 of the scale mounted on an object to be inspected, and is divided into a plurality of diffracted lights including +1st-order diffracted light R0+1 and −1st-order diffracted light R0−1, and these diffracted lights are subjected to phase modulation. The −1st-order diffracted light R0−1 is absorbed by a light absorbing layer (not shown) lying at a predetermined location. Now, the phase of the +1st-order diffracted light R0+1 shifts by $+2\pi x/P$, where x is the amount of movement of the diffraction grating G2, and P is the pitch of the diffraction grating G2.

The +1st-order diffracted light R0+1 enters the third diffraction grating G3, is transmissively diffracted by the third diffraction grating G3, and is divided into −1st-order diffracted light R0+1−1 and other diffracted lights, of which the −1st-order diffracted light R0+1−1 is taken out perpendicularly to the diffraction grating surface of the third diffraction grating G3. The phase of the wave surface of this 1st-order diffracted light R0+1−1 is $+2\pi x/P$.

The light beam R+1 +1st-order diffracted by the diffraction grating G1 is reflectively diffracted at a point O3 on the diffraction grating G2 of the scale and is divided into a plurality of diffracted lights including −1st-order diffracted light R+1−1, which are subjected to phase modulation. At this time, the −1st-order diffracted light R+1−1 enters the third diffraction grating G3 with its phase shifted by $-2\pi x/P$, is transmissively diffracted by the third diffraction grating G3 and is divided into rectilinearly travelling 0-order diffracted light R+1−10 and other diffracted lights. At that time, the phase of the wave surface of the 0-order diffracted light R+1−10 rectilinearly travelling through the third diffraction grating G3 is $-2\pi x/P$.

The light beam R+1−10 and light beam R0+1−1 having their optical path superposed one upon another and combined together by the third diffraction grating G3 become interference lights which enter light receiving elements 3a and 3b. At this time, the phase of each interference light is $$\{+2\pi x/P\}-\{-2\pi x/P\}=4\pi x/P$$

and each time the second diffraction grating G2 of the scale is moved by ½ pitch, a bright and dark variation of one cycle occurs. In the present embodiment, the arrangement of the gratings of the third diffraction grating G3 is shifted by ¼ between portions corresponding to the light receiving elements 3a and 3b and accordingly, signals obtained from the light receiving elements 3a and 3b are two-phase signals which are 90° out of phase ($\pi/2$) with each other.

The present embodiment is of a construction in which the interference optical system is very simple, and can realize a compact and inexpensive encoder by making lenses and diffraction gratings on both sides of a glass by a replica manufacturing method or the like.

Since the interference light is a single interference light beam obtained by the interference between a pair of light beams, the amplitudes of the output signals from the light receiving elements 3a and 3b are stable and the phase difference therebetween also is stable.

Figure 3:
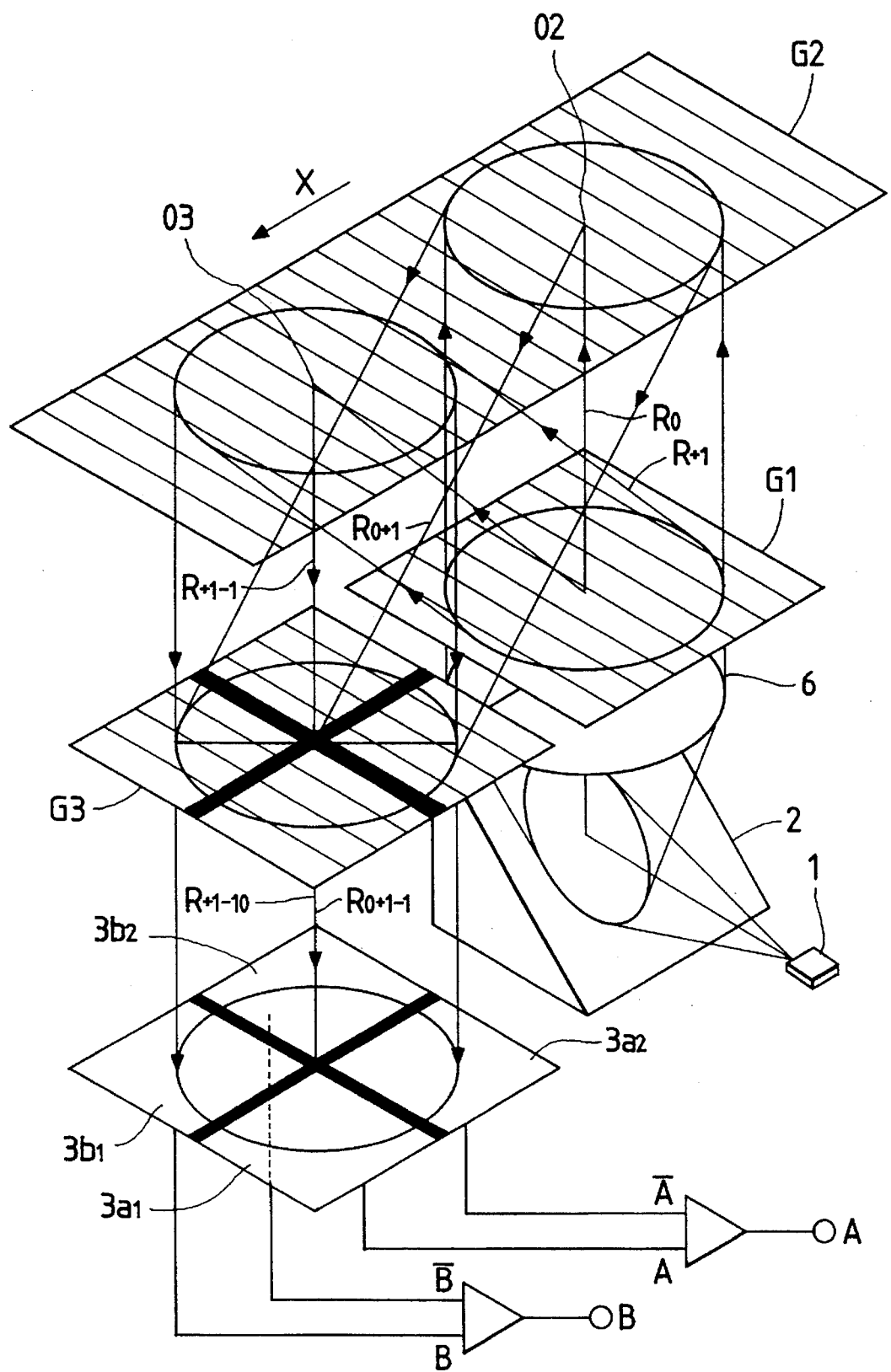
FIG. 3 is a schematic view showing a second embodiment of the present invention.
Figure 4:
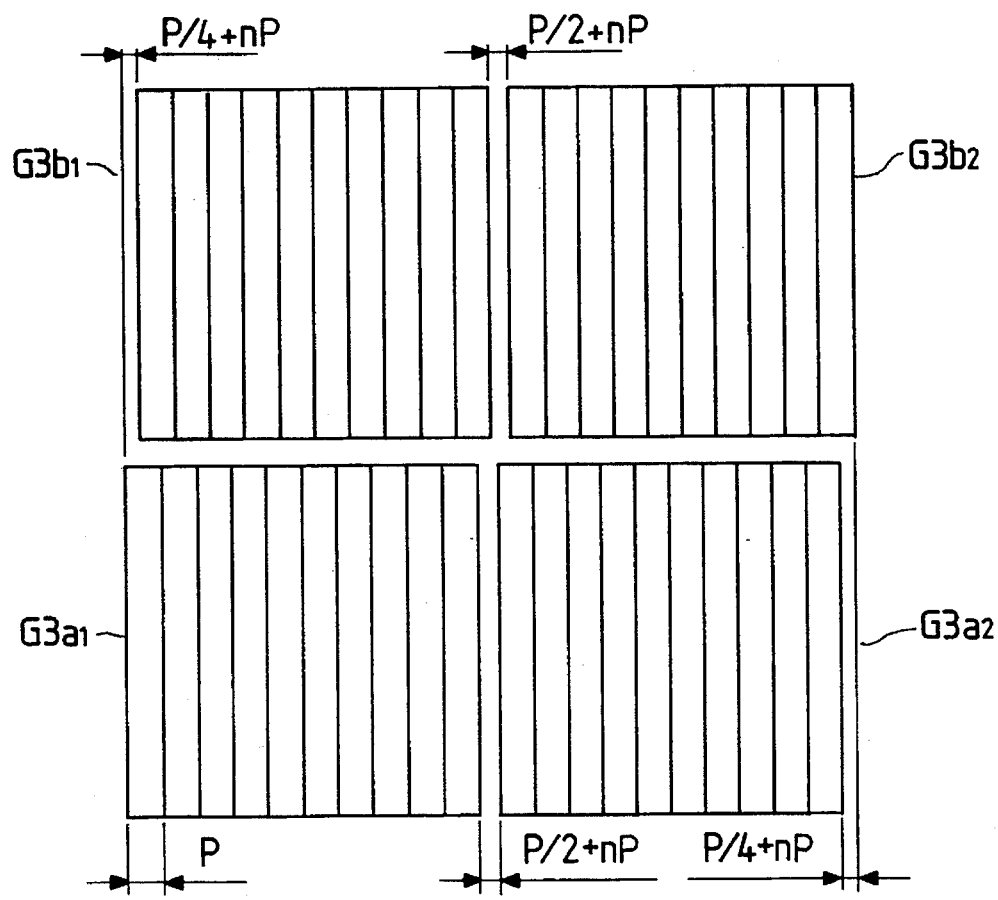
FIG. 4 is an illustration showing a four-division diffraction grating used in the second embodiment of the present invention.

FIG. 3 is a schematic view showing a second embodiment of the present invention, and FIG. 4 is an illustration showing the third diffraction grating of FIG. 3 divided into four phases.

Numeral 1 designates a light emitting element such as a semiconductor laser or an LED, numeral 2 denotes a bending mirror, the reference characters 3a1, 3a2, 3b1 and 3b2 designate light receiving elements for photoelectrically converting interference light and outputting displacement detection signals, G1 denotes a first diffraction grating for dividing a light beam, G2 designates a second diffraction grating as a scale displaceable in x direction, and G3 denotes a third diffraction grating divided into four phases of gratings for combining light beams together, the third diffraction grating G3 having a grating surface parallel to the grating surfaces of the first and second diffraction gratings G1, G2. The reference numeral 6 designates a collimator lens for collimating divergent light from the light emitting element 1, and P denotes the grating pitch of the third diffraction grating G3. The divergent light beam emitted from the light emitting element 1 has its way bent by the mirror 2, is made into a parallel light beam by the lens 6, enters the first diffraction grating G1, is transmissively diffracted by the first diffraction grating G1, is divided chiefly into 0-order diffracted light R0,+1st-order diffracted light R+1 and −1st-order diffracted light R−1, not shown, and emerges from the first diffraction grating G1.

The light beam R0 which has rectilinearly travelled through the first diffraction grating G1 is reflectively diffracted at a point O2 on the diffraction grating G2 of the scale, is divided into a plurality of diffracted lights including +1st-order diffracted light R0+1 and −1st-order diffracted light, not shown, and is also subjected to phase modulation. The −1st-order diffracted light enters a predetermined light absorbing layer (not shown) and is absorbed thereby.

The phase of the +1st-order diffracted light R0+1 shifts by $+2\pi x/P$, where x is the amount of movement of the diffraction grating G2, and P is the pitch of the diffraction grating G2.

The +1st-order diffracted light R0+1 enters the third diffraction grating G3, is transmissively diffracted by the third diffraction grating G3, and is divided into −1st-order diffracted light R0+1−1 and other diffracted lights, of which the −1st-order diffracted light R0+1−1 is taken out perpendicularly to the diffraction grating surface of the third diffraction grating G3, and the phase of the wave surface thereof is $+2\pi x/P$.

The light beam R+1,+1st-order-diffracted by the first diffraction grating G1, is reflectively diffracted at a point O3 on the diffraction grating G2 on the scale, is divided into a plurality of diffracted lights including −1st-order diffracted light R+1−1 and +1st-order diffracted light (not shown) and is also subjected to phase modulation. The −1st-order diffracted light R+1−1 enters the third diffraction grating G3 with its phase shifted by $-2\pi x/P$, is transmissively diffracted by the third diffraction grating G3, and is divided into rectilinearly travelling 0-order diffracted light R+1−10 and other diffracted lights. At that time, the phase of the wave surface of the 0-order diffracted light R+1−10 rectilinearly travelling through the third diffraction grating G3 is $-2\pi x/P$.

The diffracted light R+1−10 and diffracted light R0+1−1 having their optical paths superposed one upon another and combined together by the third diffraction grating G3 become interference lights which enter the light receiving elements 3a, 3b, 3c and 3d. At this time, the phase of each interference light is $$\{+2\pi x/P\}-\{-2\pi x/P\}=4\pi x/P$$

and each time the second diffraction grating G2 on the scale is moved by ½ pitch, a bright and dark variation of one cycle occurs. In the present embodiment, the grating arrangement of the third diffraction grating G3 is divided into four as shown in FIG. 4 and is made with the phases shifted with respect to one another, whereby stable four-phase signals A, B, $\overline{A}$ and $\overline{B}$ which are 90° out of phase with one another are obtained from the light receiving elements 3a1, 3b1, 3a2 and 3b2 In FIG. 4, n is a positive integer greater than 0.

Again the present embodiment is of a construction in which the interference optical system is very simple, and if lenses and diffraction gratings are made on both sides of a glass by a replica manufacturing method or the like, there could be realized a compact and inexpensive encoder.

The interference light is only a single interference light beam obtained by the interference between a pair of light beams and therefore, the interference state can be regarded as being substantially uniform in the cross-section thereof, and this uniform interference area is divided into four by the third diffraction grating G3 assuming such structure as shown in FIG. 4. Since in the four interference areas, the interference states are uniform with one another, the phase difference between the interference areas imparted by the third diffraction grating G3 is kept constant. In FIG. 4, two signals which are 180° out of phase with each other are obtained from the light receiving elements 3a1 and 3a2 and the light receiving elements 3b1 and 3b2, and when the two signals are A phase and B phase, respectively, as shown in FIG. 3, there can be obtained stable two-phase signal outputs A and B which are 90° out of phase with each other. Four interference lights divided into four by the four portions G3b1, G3b2, G3a1 and G3a2 of the third diffraction grating G3 and having phase differences therebetween pass along substantially the same optical path. Thereby, the influence of the phase differences upon the outputs of respective phases due to the accuracy or the like of the parts is the same among the four phases. Thus, the influence of the phase differences upon the outputs due to the accuracy or the like of the parts becomes very small.

In the present embodiment, the four portions G3b1, G3b2, G3a1 and G3a2 are distributed in a square shape, but may also be distributed in any other suitable shape than the square shape.

Figure 6:
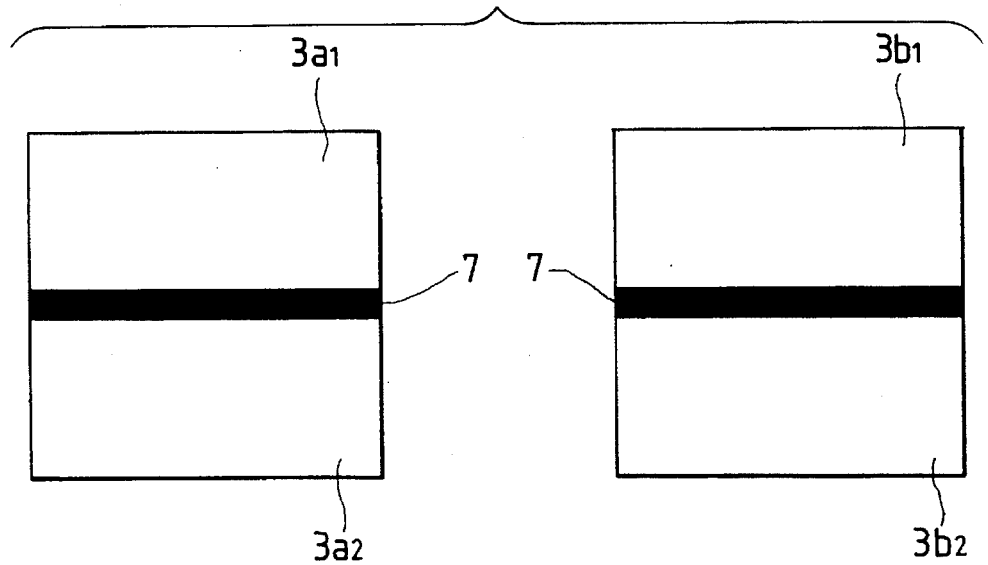
FIG. 6 is an illustration showing a light receiving element used in the third embodiment of the present invention.
Figure 5:
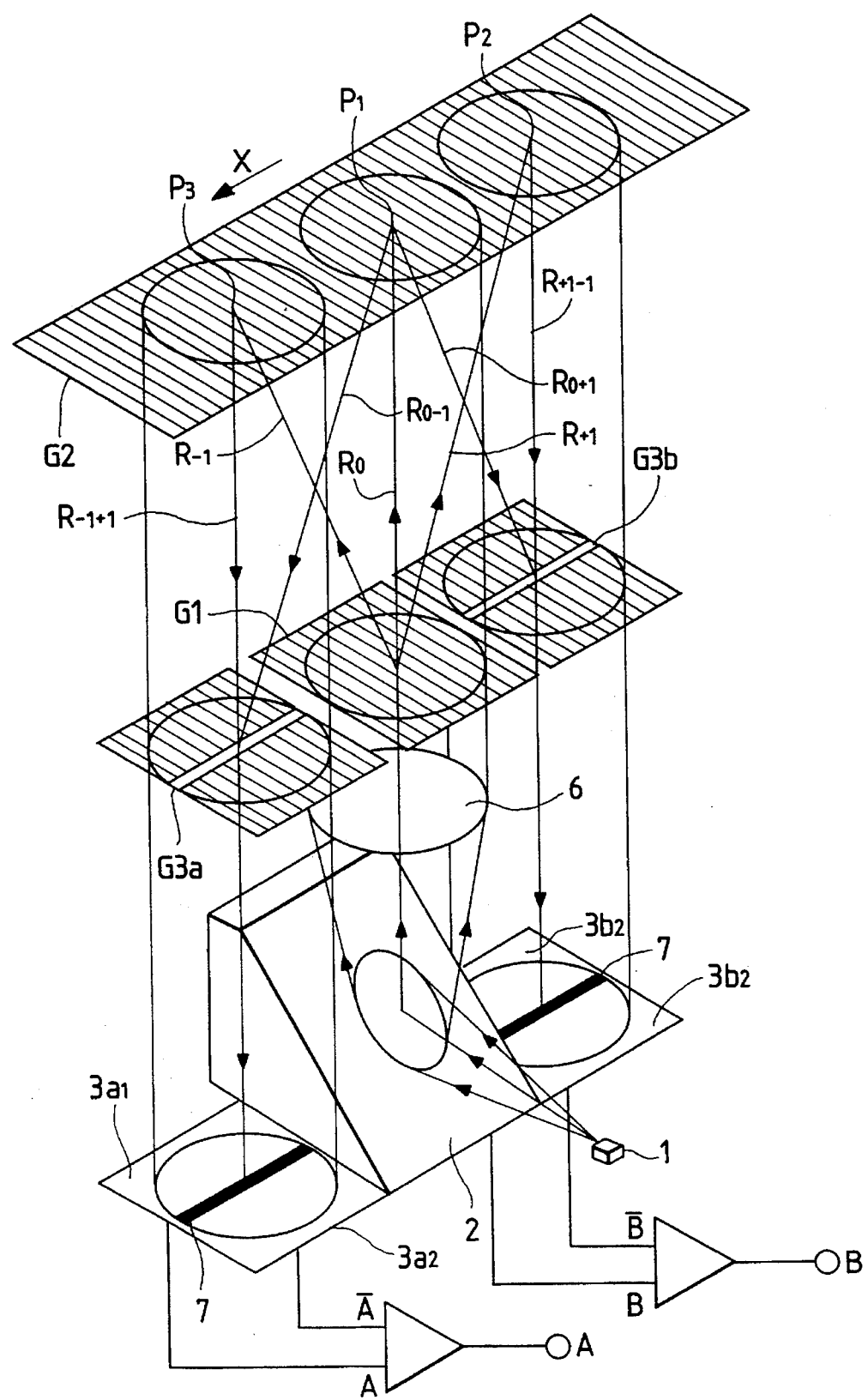
FIG. 5 is a schematic view showing a third embodiment of the present invention.

FIG. 5 is a schematic view showing a third embodiment of the present invention, and FIG. 6 is an illustration showing the construction and arrangement of the light receiving elements of the apparatus of FIG. 5.

Numeral 1 designates a light emitting element such as a semiconductor laser or an LED, the numeral 2 denotes a bending mirror, the reference characters 3a1–3b2 designate light receiving elements for photoelectrically converting interference light and outputting displacement detection signals, G1 denotes a first diffraction grating for dividing a light beam, G2 designates a second diffraction grating as a scale displaceable in the x direction, G3a and G3b denote third diffraction gratings divided into two phases for combining light beams together, numeral 6 designates a collimator lens for collimating divergent light from the light emitting element 1, and numeral 7 denotes light intercepting masks formed between the light receiving elements 3a1 and 3a2 and between the light receiving elements 3b1 and 3b2. The divergent light beam emitted from the light emitting element 1 has its way bent by the mirror 2, is made into a parallel light beam by the lens 6, enters the first diffraction grating G1, is transmissively diffracted by the first diffraction grating G1, is divided chiefly into 0-order diffracted light R0, +1st-order diffracted light R+1 and −1st-order diffracted light R−1 and emerges therefrom.

The light beam R0 rectilinearly travelling through the first diffraction grating G1 is reflectively diffracted at a point P1 on the second diffraction grating G2 of the scale, and is divided into +1st-order diffracted light R0+1 and −1st-order diffracted light R0−1, which are subjected to phase modulation.

The phase of the +1st-order diffracted light R0+1 shifts by $+2\pi x/P$, and the phase of the −1st-order diffracted light R0−1 shifts by $-2\pi x/P$, where x is the amount of movement of the second diffraction grating G2, and P is the pitch of the second diffraction grating G2.

The +1st-order diffracted light R0+1 is transmissively diffracted by the third diffraction grating G3b and is divided into 0-order diffracted light, −1st-order diffracted light R0+1−1 and other light beams, of which the −1st-order diffracted light R0+1−1 is taken out perpendicularly to the diffraction grating surface of the grating G3b, and at this time, the phase of the wave surface thereof is $+2\pi x/P$.

The −1st-order diffracted light R0−1 is transmissively diffracted by the third diffraction grating G3a, and is divided into 0-order diffracted light, +1st-order diffracted light R0−1+1 and other light beams, of which the +1st-order diffracted light R0−1+1 is taken out perpendicularly to the diffraction grating surface of the grating G3a, and at this time, the phase of the wave surface thereof is $-2\pi x/P$.

If the phase relation of the third diffraction grating G3b is shifted by P/4 relative to the other third diffraction grating G3a, the +1st-order diffracted light R0−1+1 will have the phase of its wave surface shifted by $-2\pi(P/4)/P=-\pi/2$ and the phase will become $-2\pi x/P-\pi/2$.

The light beam R+1,+1st-order-diffracted by the first diffraction grating G1, is reflectively diffracted at a point P2 on the diffraction grating G2 of the scale, and is divided into −1st-order diffracted light R+1−1, 0-order diffracted light and other light beams, which are subjected to phase modulation. The −1st-order diffracted light R+1−1 has its phase shifted by $-2\pi x/P$, enters the third diffraction grating G3b and is transmissively diffracted by the third diffraction grating G3b, and the phase of the wave surface of the rectilinearly travelling 0-order diffracted light R+1−10 becomes $-2\pi x/P$.

The light beam R1, −1st-order-diffracted by the first diffraction grating G1, is reflectively diffracted at a point P3 on the diffraction grating G2 on the scale, and is divided into +1st-order diffracted light R−1+1, 0-order diffracted light and other light beams, which are subjected to phase modulation. The +1st-order diffracted light R−1+1 has its phase shifted by $+2\pi x/P$ and enters the third diffraction grating G3a, and the phase of the wave surface of the rectilinearly travelling 0-order diffracted light R−1+10 is $+2\pi x/P$.

The diffracted light beam R+1−10 and diffracted light beam R0+1−1 having their optical paths superposed one upon the other and combined together by the third diffraction grating G3b become interference lights and enter the light receiving elements 3b1 and 3b2. At this time, the phase of each interference light is $$\{+2\pi x/P\}-\{-2\pi x/P\}=4\pi x/P$$

and each time the second diffraction grating G2 of the scale is moved by ½ pitch, a bright and dark variation of one cycle occurs.

The diffracted light beam R−1+10 and diffracted light beam R0−1+1 having their optical paths superposed one upon another and combined together by the third diffraction grating G3a become interference lights and enter the light receiving elements 3a1 and 3a2. At this time, the phase of each interference light is $$\{-2\pi x/P\}-\{+2\pi x/P\}=4\pi x/P$$

and each time the second diffraction grating G2 of the scale is moved by ½ pitch, a bright and dark variation of one cycle occurs. In the present embodiment, the third diffraction gratings G3a and G3b are spaced apart from each other by ¼ pitch plus integer times, and each of the gratings G3a and G3b is divided into two halves, and the divided two grating portions are disposed with deviation of ½ pitch therebetween, and four-phase signals A, B, $\overline{A}$ and $\overline{B}$ which are 90° out of phase with one another are obtained from the light receiving elements 3a1, 3b1, 3a2 and 3b2.

The present embodiment is of a construction in which the interference optical system is very simple, and if lenses and diffraction gratings are made on both sides of a glass by a replica manufacturing method or the like, there could be realized a compact and inexpensive encoder.

Also, the light receiving element is divided into two areas by the light intercepting mask 7 and the divided areas are separated from each other and therefore, even if there occur the mounting errors or the like of the scale and head, the interference light beam separated in the third diffraction gratings G3a and G3b will enter only the corresponding one area of the light receiving element divided into two. Further, in the multi-divided third diffraction grating G3, the light beam diffracted at the end of the area adjacent thereto can also be intercepted. Accordingly, there can be obtained four-phase signals stable in amplitude and phase difference which do not depend on the mounting errors or the like of the scale and head.

Figure 7:
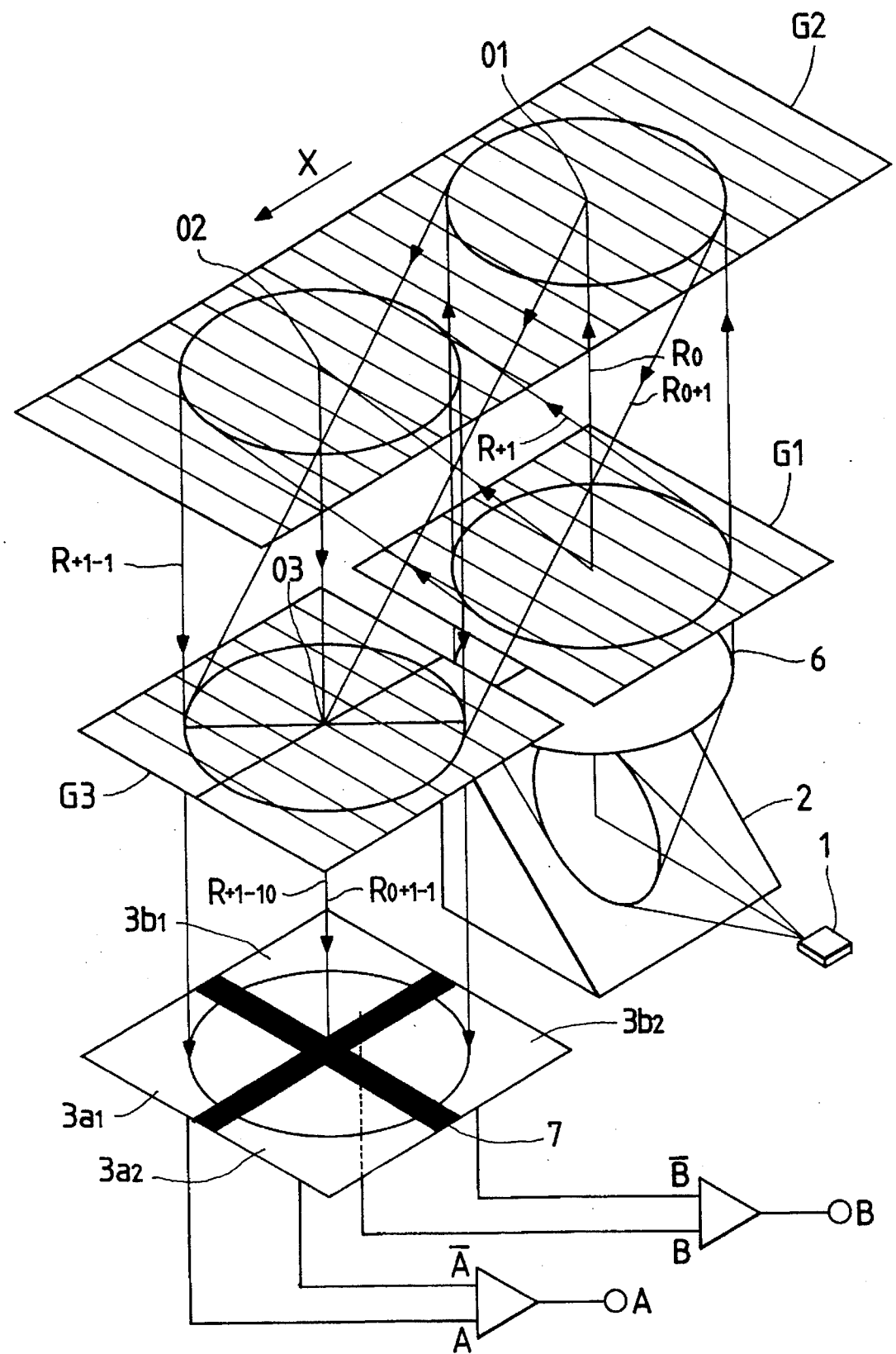
FIG. 7 is a schematic view showing a fourth embodiment of the present invention.
Figure 8:
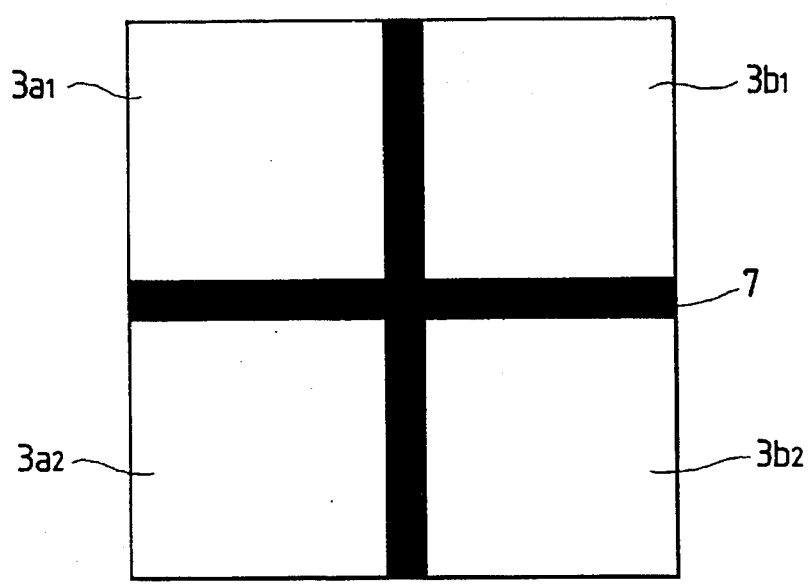
FIG. 8 is an illustration showing a light receiving element used in the fourth embodiment of the present invention.
Figure 9:
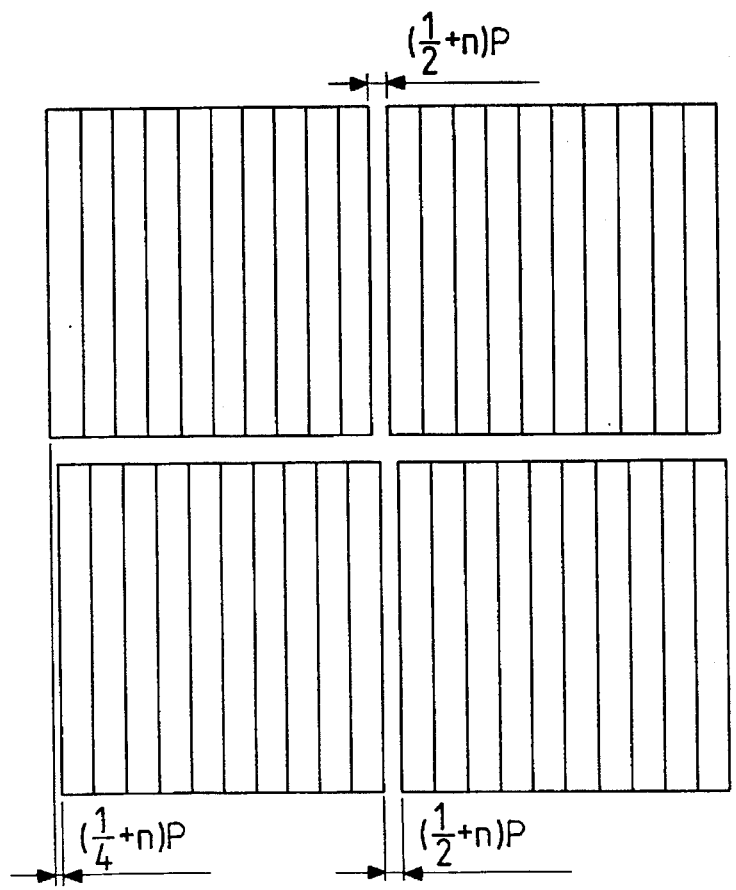
FIG. 9 is an illustration showing a four-division diffraction grating used in the fourth embodiment of the present invention.

FIG. 7 is a schematic view showing a fourth embodiment of the present invention, FIG. 8 is an illustration showing the construction and arrangement of the light receiving elements of the apparatus of FIG. 7, and FIG. 9 is an illustration of the third diffraction grating G3 of FIG. 7.

Numeral 1 designates a light emitting element such as a semiconductor laser or an LED, numeral 2 denotes a bending mirror, the reference characters 3a1, 3a2, 3b1 and 3b2 designate light receiving elements for photoelectrically converting interference light and outputting displacement detection signals (sine wave signals), G1 denotes a first diffraction grating for dividing a light beam, G2 designates a second diffraction grating as a scale displaceable in the x direction, G3 denotes a third diffraction grating divided into four phases for combining light beams, numeral 6 designates a collimator lens for collimating divergent light from the light emitting element 1, numeral 7 denotes a light intercepting cruciform mask, and P designates the pitch of the third diffraction grating G3. The divergent light beam emitted from the light emitting element 1 has its way bent by the mirror 2, is made into a parallel light beam R by the lens 6, enters the first diffraction grating G1, is transmissively diffracted by the first diffraction grating G1, and is divided chiefly into 0-order diffracted light R0, +1st-order diffracted light R+1 and −1st-order diffracted light (not shown) which emerge from the first diffraction grating.

The light beam R0, rectilinearly travelling through the first diffraction grating G1, is reflectively diffracted at a point 01 on the second diffraction grating G2 formed on the scale, and is divided into +1st-order diffracted light R0+1 and −1st-order diffracted light R0+1, which are subjected to phase modulation.

The phase of the +1st-order diffracted light R0+1 shifts by +2πx/P, where x is the amount of movement of the diffraction grating G2, and P is the pitch of the second diffraction grating G2.

The +1st-order diffracted light R0+1 enters the third diffraction grating G3, is transmissively diffracted by the third diffraction grating G3, and is divided into 0-order diffracted light, −1st-order diffracted light R0+1−1 and other diffracted light beams, of which the −1st-order diffracted light R0+1−1 is taken out perpendicularly to the grating surface of the diffraction grating G3, and the phase of the wave surface thereof is +2πx/P.

The diffracted light beam R+1−10 and diffracted light beam R0+1−1 having their optical paths superposed one upon the other and combined together by the third diffraction grating G3 become interference lights and enter the light receiving elements 3a1–3b2. At this time, the phase of each interference light is $$\{+2\pi x/P\}-\{-2\pi x/P\}=4\pi x/P$$

and each time the second diffraction grating G2 on the scale is moved by ½ pitch, a bright and dark variation of one cycle occurs. When the arrangement of the gratings of the third diffraction grating G3 is effected as shown in FIG. 9, stable four-phase signals A, B, $\overline{A}$ and $\overline{B}$ which are 90° out of phase with one another are obtained from the light receiving elements 3a1–3b2. In FIG. 9, n is a positive integer, and P is the grating pitch.

The present embodiment is of a construction in which the interference optical system is very simple, and if lenses and diffraction gratings are made on both sides of a glass by a replica manufacturing method or the like, there could be realized a compact and inexpensive encoder.

The present embodiment uses only a single interference light beam created by the interference between a pair of light beams and therefore, within the interference area of the interference light, the interference state can be regarded as being substantially uniform. This uniform interference area is divided into four by the third diffraction grating G3 shown in FIG. 9. Since the interference state is uniform in the whole of the four divided interference areas, the phase difference between the areas provided by the third diffraction grating G3 is kept constant. As will be understood from FIG. 9, the light receiving elements 3a1 and 3a2 and the light receiving elements 3b1 and 3b2 can provide two signals A and $\overline{A}$ and two signals B and $\overline{B}$, respectively, which are 180° out of phase with each other, and if these signals are A and B phases as shown in FIG. 7, there could be obtained two-phase signals A and B which are 90° out of phase with each other.

The four divided interference lights given the phase differences pass along substantially the same optical path. Thereby, the influence of the phase differences upon the outputs of respective phases due to the accuracy or the like of the parts becomes the same among the four phases. Thus, the influence of the phase differences upon the outputs due to the accuracy or the like of the parts becomes very small.

The light receiving element is separated into four by the cruciform light intercepting mask 7. Therefore, even if there occur the mounting errors or the like of the scale and head, the light beam in each interference area separated in the third diffraction grating G3 will enter only a corresponding one of the four light receiving elements. Further, in the multi-divided third diffraction grating G3, the light beam diffracted at the end of the area adjacent thereto can also be intercepted.

Figure 10:
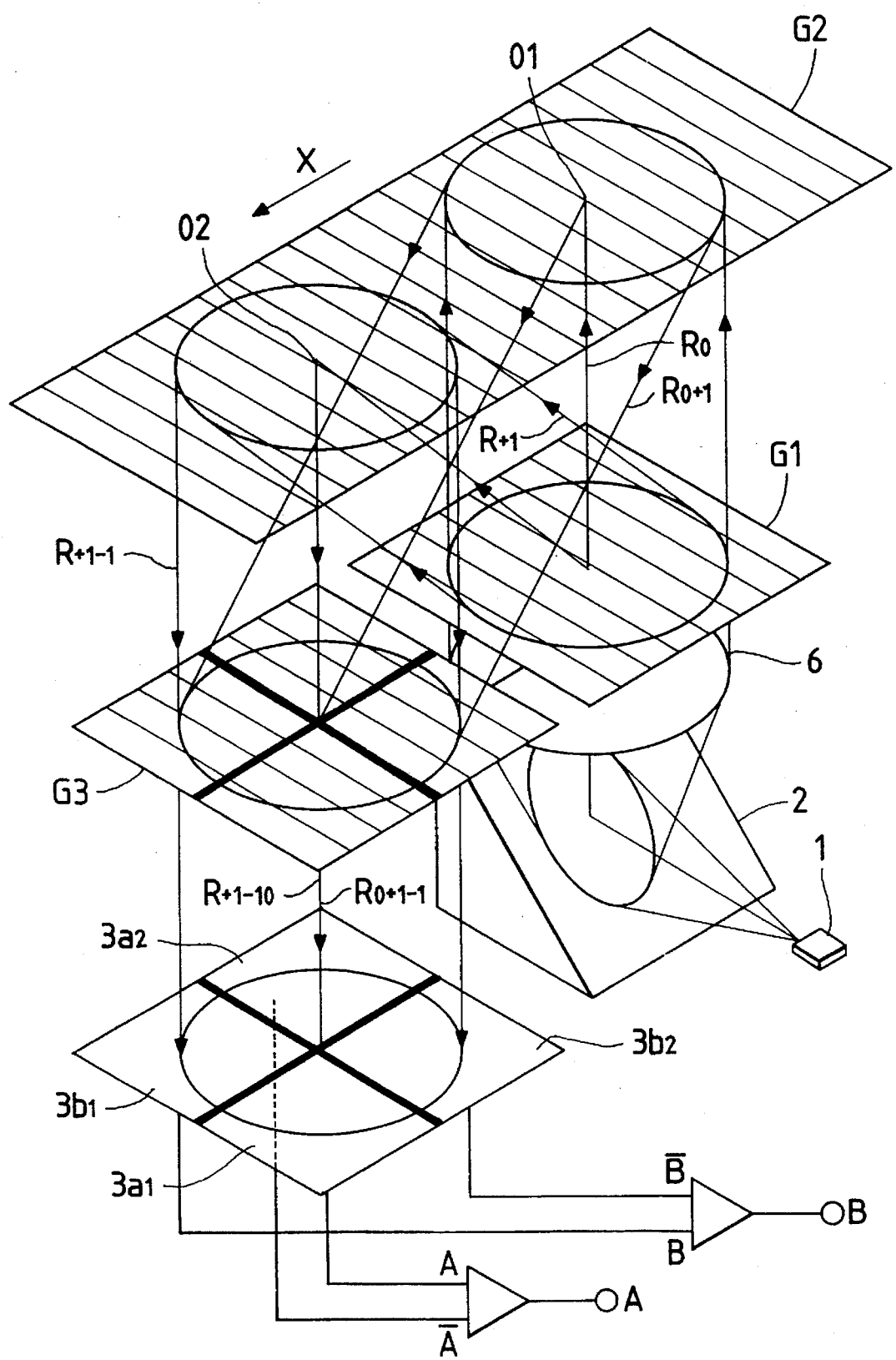
FIG. 10 is a schematic view showing a fifth embodiment of the present invention.
Figure 11:
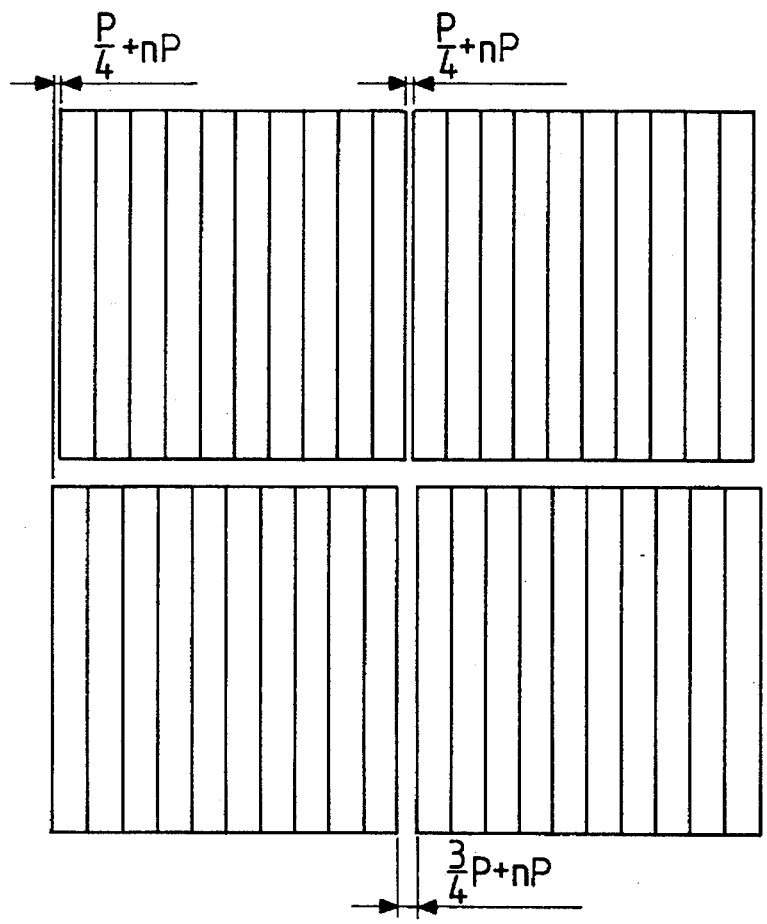
FIG. 11 illustrates a four-division diffraction grating used in the fifth embodiment of the present invention.
Figure 12A:
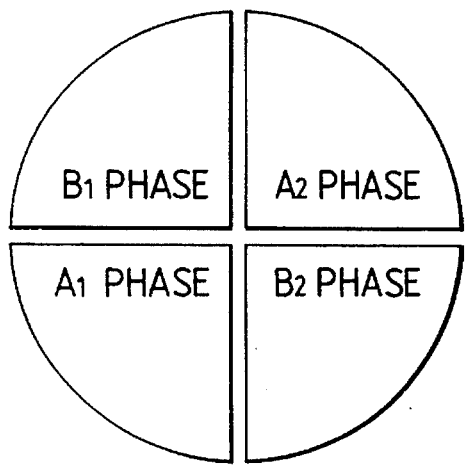
FIGS. 12A and 12B are illustrations of a four-division light receiving element used in the fifth embodiment of the present invention.
Figure 12B:
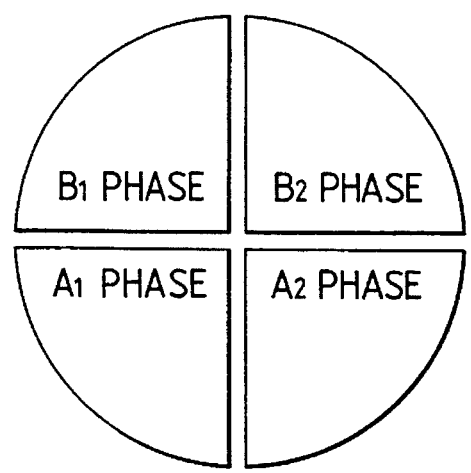

FIG. 10 is a schematic view showing a fifth embodiment of the present invention, FIG. 11 is an illustration of the third diffraction grating of the apparatus of FIG. 10 which is divided into four phases, and FIGS. 12A and 12B are illustrations showing the arrangement and effect of the light receiving elements of the apparatus of FIG. 10.

The reference numeral 1 designates a light emitting element such as a semiconductor laser or an LED, the reference numeral 2 denotes a bending mirror, the reference characters 3a1, 3a2, 3b2 and 3b2 designate light receiving elements for photoelectrically converting interference light to thereby output displacement detection signals, G1 denotes a first diffraction grating for dividing a light beam, G2 designates a second diffraction grating as a scale displaceable in the x direction, G3 denotes a third diffraction grating divided into four phases for combining light beams together, the reference numeral 6 designates a collimator lens for collimating divergent light from the light emitting element 1, and P denotes the pitch of the third diffraction grating G3. The divergent light beam emitted from the light emitting element 1 has its way bent by the mirror 2, is made into a parallel light beam R by the lens 6, enters the first diffraction grating G1, is transmissively diffracted by the first diffraction grating G1, and is divided chiefly into 0-order diffracted light R0, +1st-order diffracted light R+1 and −1st-order diffracted light, which emerge from the first diffraction grating.

The light beam R0, rectilinearly travelling through the first diffraction grating G1, is reflectively diffracted at a point O2 on the diffraction grating G2 formed on the scale, and is divided into a plurality of diffracted light beams including +1st-order diffracted light R0+1 and −1st-order diffracted light (not shown), which are subjected to phase modulation.

The phase of the +1st-order diffracted light R0+1 shifts by +2πx/P, where x is the amount of movement of the diffraction grating G2, and P is the pitch of the second diffraction grating G2.

The +1st-order diffracted light R0+1 enters the third diffraction grating G3, is transmissively diffracted by the third diffraction grating G3, and is divided into 0-order diffracted light, −1st-order diffracted light R0+1−1 and other beams of diffracted light, of which the +1st-order diffracted light R0+1−1 is taken out perpendicularly to the grating surface of the third diffraction grating G3, and the phase of the wave surface thereof is +2πx/P.

The +1st-order diffracted light R+1 from the first diffraction grating G1 is reflectively diffracted at a point O3 on the diffraction grating G2 on the scale and is divided into a plurality of diffracted light beams including −1st-order diffracted light R+1−1 and +1 st-order diffracted light (not shown), which are subjected to phase modulation. The −1st-order diffracted light R+1−1 has its phase shifted by −2πx/P, enters the third diffraction grating G3, is transmissively diffracted by the third diffraction grating G3, and is divided into rectilinearly travelling 0-order diffracted light R+1−10 and other light beams. At that time, the phase of the wave surface of the 0-order diffracted light R+1−10 rectilinearly travelling through the third diffraction grating G3 is −2πx/P.

The diffracted light beam R+1−10 and diffracted light beam R0+1−1 having their optical paths superposed one upon another and combined together by the third diffraction grating G3 become interference lights, which enter the light receiving elements 3a1, 3a2, 3b1 and 3b2. At this time, the phase of each interference light is {+2πx/P}−{−2πx/P}=4πx/P and each time the second diffraction grating G2 on the scale is moved by ½ pitch, a bright and dark variation of one cycle occurs. When the arrangement of the gratings of the third diffraction grating G3 is made such as shown in FIG. 11, four-phase signals A, B, $\overline{A}$ and $\overline{B}$ having a phase difference of 90° therebetween can be stably obtained from the light receiving elements 3a1–3b2.

The present embodiment is of a construction in which the interference optical system is very simple, and if lenses and diffraction gratings are made on both sides of a glass by a replica manufacturing method or the like, there could be realized a compact and inexpensive encoder.

The interference state of single interference light beam formed by the interference between a pair of light beams can be regarded as being substantially uniform in the cross-section of that interference light. This uniform interference light is divided into four by the third diffraction grating G3 being made into such structure as shown in FIG. 11. Since the interference state of each portion (interference area) of the interference light is uniform, the phase difference of the respective areas given by the third diffraction grating is kept constant. In FIG. 11, two signals which are 180° out of phase with each other are obtained from the light receiving elements 3a1 and 3a2 and the light receiving elements 3b1 and 3b2, respectively, and when these signals are A and B phases as shown in FIG. 10, there can be obtained stable two-phase signals A and B which are 90° out of phase with each other.

The four divided interference lights given the phase difference pass along substantially the same optical path. Thereby, the influence of the phase difference upon the output of each phase due to the accuracy or the like of the parts becomes the same among the four phases. Thus, the influence of the phase difference upon the output due to the accuracy or the like of the parts becomes very small. If the interference state is changed by the relative mounting error or the like between the head portion and the scale portion and an interference fringe is formed on the sensor surface, the phase difference between A phase and B phase will vary. However, since the third diffraction grating G3 for combining the light beams together is constructed as shown in FIG. 11, the phase difference between A phase and B phase will not vary from a value of π/2.

The reason for this will hereinafter be described. FIG. 12A shows the arrangement of sensors of respective phases when the construction of the present invention is adopted, and FIG. 12B shows the arrangement of sensors of respective phases when other construction is adopted. The output amplitudes of A1 phase, A2 phase, B1 phase and B2 phase are $\phi_{A1}$, $\phi_{A2}$, $\phi_{B1}$ and $\phi_{B2}$, respectively. Also, the output amplitudes of A1 phase −A2 phase and B1 phase −B2 phase are $\phi_A$ and $\phi_B$, respectively. Assuming that lateral fringes are formed on the sensors, the states of the fringes are the same among the sensors arranged in the same direction as the direction in which the fringes are formed and therefore, no shift of the phase difference occurs. Also, the states of the fringes differ between the sensors arranged in a direction perpendicular to the fringes and therefore, the shift of the phase difference becomes F(N) (where N is the number of the fringes, and F(N) is a function of N and will be described in detail below). Accordingly, when the sensor A1 is the reference of the phase, if the sensor arrangement of FIG. 12A is adopted, the output amplitudes of A1 phase, A2 phase, B1 phase and B2 phase will become as follows. Here, Φ is the maximum amplitude of the output amplitude, k is a wave number vector corresponding to the vibration of the output, x is the amount of movement of the scale, and π is the ratio of the circumference of a circle to its diameter.

$\phi_{A1} = \Phi \mathrm{Sin}[kx]$ $\phi_{A2} = \Phi \mathrm{Sin}[kx + \pi + F(N)]$ $\phi_{B1} = \Phi \mathrm{Sin}[kx + \pi/2 + F(N)]$ (1-1)

$\phi_{B2} = \Phi \mathrm{Sin}[kx + 3\pi/2]$

Also, if the sensor arrangement of FIG. 12B is adopted, the output amplitudes of A1 phase, A2 phase, B1 phase and B2 phase will become as follows.

$$\phi_{A1} = \Phi \mathrm{Sin}[kx]$$

$$\phi_{A2} = \Phi \mathrm{Sin}[kx+\pi]$$

$$\phi_{B1} = \Phi \mathrm{Sin}[kx+\pi/2+F(N)] \quad (2\text{-}1)$$

$$\phi_{B2} = \Phi \mathrm{Sin}[kx+3\pi/2+F(N)]$$

From this, if the sensor arrangement of FIG. 12A is adopted, the output amplitudes $\phi_A$ and $\phi_B$ of A and B phases will become as follows from (1-1).

$$\begin{aligned}\phi_A &= \phi_{A1} - \phi_{A2} = 2\Phi \mathrm{Cos}[F(N)/2]\mathrm{Sin}[kx + F(N)/2] \\ &= \Phi' \mathrm{Sin}[kx + F(N)/2] \\ \phi_B &= \phi_{B1} - \phi_{B2} = 2\Phi \mathrm{Cos}[F(N)/2]\mathrm{Sin}[kx + \pi/2 + F(N)/2]\end{aligned}$$

From this, the phase difference $\delta$ between A and B phases is $$\delta = kx+\pi/2+F(N)/2-[kx+F(N)/2]=\pi/2$$

and is constant irrespective of the number N of the fringes. If the sensor arrangement of FIG. 12B is adopted, the output amplitudes $\phi_A$ and $\phi_B$ of A and B phases will become as follows from (2-2).

$$\begin{aligned}\phi_A &= \phi_{A1} - \phi_{A2} = 2\Phi \mathrm{Sin}[kx] = \Phi'' \mathrm{Sin}[kx] \\ \phi_B &= \phi_{B1} - \phi_{B2} = 2\Phi \mathrm{Sin}[kx + \pi/2 + F(N)] \\ &= \Phi'' \mathrm{Sin}[kx + \pi/2 + F(N)]\end{aligned}$$

From this, the phase difference $\delta$ between A and B phases is $$\delta = kx+\pi/2+F(N)-kx = \pi/2+F(N)$$

and is not fixed at $\pi/2$, but varies depending on the number N of the fringes. Also, when vertical fringes are formed, even if the sensor arrangement of FIG. 12A is adopted, the phase difference between A phase and B phase will become constant. Also, in the case of oblique fringes, when these are considered while being divided into vertical fringe components and lateral fringe components, if the sensor arrangement of FIG. 12A is adopted, the phase difference between A and B phases will not vary relative to the vertical fringes and therefore will become constant. However, if the sensor arrangement of FIG. 12B is adopted, the phase difference between A and B phases will vary relative to the lateral fringes and therefore will not become constant. F(N) will now be described. F(N) is a function of the shape and arrangement of the sensors, the number of the fringes, the direction in which the fringes are formed, the contrast of the light and the intensity distribution of the light. For example, if the contrast and intensity distribution of the light are constant, when comparison is made between a case where the shape of the sensors is circular and a case where the shape of the sensors is rectangular, in the case of the circular shape, the phase of the outputs of the sensors will not vary in whatever direction fringes may be formed. However, in the case of the rectangular sensors, the magnitude of the signal outputs will vary even in the same state of the fringes, depending on the direction in which the fringes are formed, and therefore the phase of the signal outputs will vary. Accordingly, it is preferable that the shape of the sensors be circular.

While in the above-described embodiment, the four portions of the third diffraction grating G3 which differ in phase are distributed in a square shape, they may also be distributed in any other suitable shape than the square shape.

Figure 13:
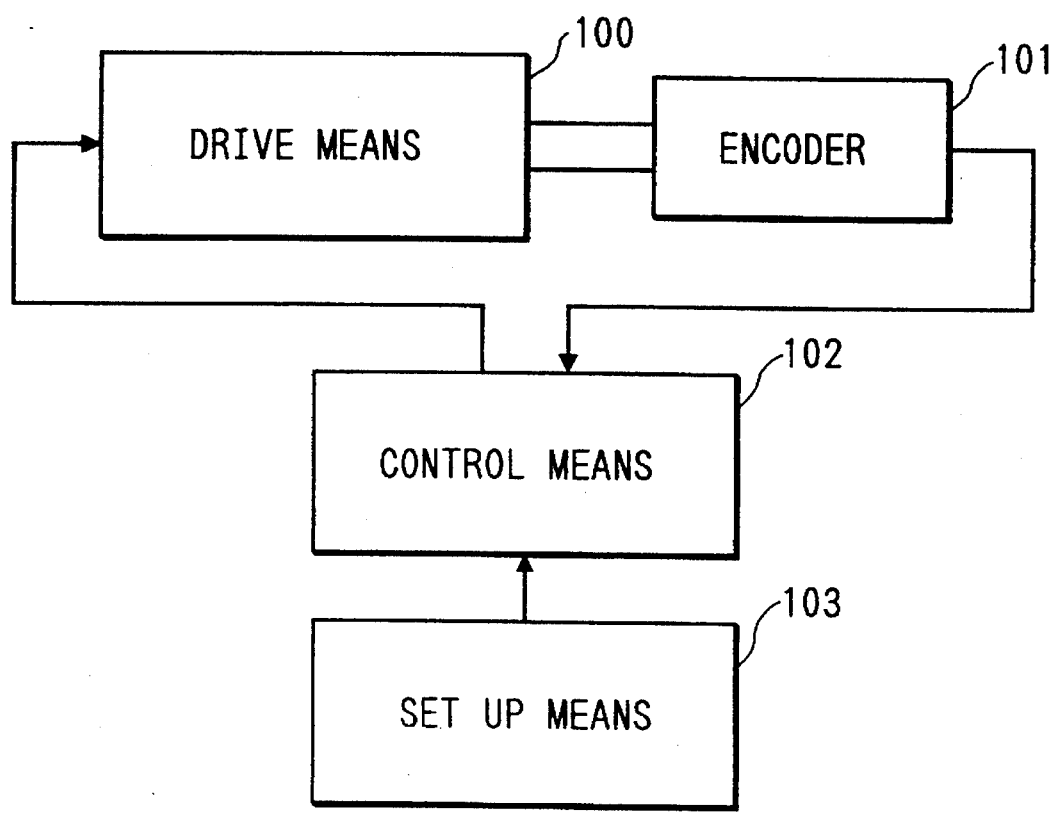
FIG. 13 is a block diagram showing an example of a drive system provided with the displacement detection apparatus of the present invention.

FIG. 13 shows an embodiment of the application of the above-described encoder, and specifically shows the system construction of a drive system using the encoder. An encoder 101 is mounted on the drive output portion of drive means 100 having a drive source such as a motor, an actuator or an engine, or on the moving portion of an object driven, and detects a displacement state such as an amount of displacement or a displacement speed. Any of the aforedescribed embodiments is used as this encoder. The detection output of this encoder 101 is fed back to control means 102, in which a drive signal is transmitted to the drive means 100 so as to bring about a state set by set up means 103. By constructing such a feedback system, the drive state set by the set up means 103 can be obtained. Such a drive system can be widely applicable to a business machine such as a typewriter, a printer, a copying machine or a facsimile apparatus, a robot, a machine tool, a manufacturing apparatus, a transportation machine and further, any apparatus having drive means.

According to the present invention, a construction in which the lens 6 disposed between the light emitting element 1 and the first diffraction grating G1 is eliminated can also be adopted in the embodiments described above with reference to FIGS. 1 to 12B.

According to the present invention, a construction in which the third diffraction grating G3 is formed on the light receiving portion of the light receiving element 3 and the two are made integral with each other can also be adopted.

According to the present invention, in the embodiments described above with reference to FIGS. 1 to 12B, the displacement detection signal is set to two or four phases, whereas design can also be made such that a displacement detection signal of three phases or five or more phases is obtained.

The present invention is also applicable to an encoder provided with an optical system of other construction than the embodiments described above with reference to FIGS. 1 to 12B.

In the present invention, the form of the first to third diffraction gratings G1–G3 may be any of the phase type and the amplitude type.

What is claimed is:

1. A displacement detection apparatus comprising means for applying to a diffraction grating two beams obtained by dividing a radiation beam, means for combining a first diffracted beam created from the diffraction grating by the application of one of said two beams and a second diffracted beam created from the diffraction grating by the application of the other beam, and light receiving means for receiving an interference beam formed by the combination of said first and second diffracted beams and converting it into a signal indicative of the displacement of said diffraction grating, said combining means being provided with first to fourth diffraction gratings differing in phase by 90° each, said light receiving means being provided with first to fourth light receiving portions for individually receiving portions of said interference beam obtained through said first to fourth diffraction gratings.

2. A displacement detection apparatus according to claim 1, wherein said first diffracted beam is +mth-order diffracted light and said second diffracted beam is −mth-order diffracted light (m being a natural number).

3. A displacement detection apparatus according to claim 1, wherein said first and second diffracted beams are formed by said radiation beam being reflected and diffracted by said diffraction grating.

4. A displacement detection apparatus according to claim 3, wherein said first, second, third and fourth diffraction gratings are distributed in a square shape, and the phase difference between those of said diffraction gratings which are located diagonally with each other is $\pi$.

5. A displacement detection apparatus according to claim 1, wherein a light intercepting portion is provided between adjacent ones of the light receiving portions of said light receiving means.

6. A displacement detection apparatus according to claim 5, wherein a light intercepting portion is provided between adjacent ones of the diffraction gratings of said combining means.

7. A displacement detection apparatus according to claim 1, wherein said applying means has a diffraction grating for dividing said radiation beam to obtain said two beams.

8. A displacement detection apparatus according to claim 7, wherein one of said two beams is 0-order diffracted light and the other beam is 1st-order diffracted light.

9. A displacement detection apparatus according to claim 8, wherein said first diffracted beam is +1st-order diffracted light and said second diffracted beam is −1st-order diffracted light.

10. A drive system including said apparatus according to claim 1.

11. A drive system including said apparatus according to claim 2.

12. A drive system including said apparatus according to claim 3.

13. A drive system including said apparatus according to claim 4.

14. A drive system including said apparatus according to claim 5.

15. A drive system including said apparatus according to claim 6.

16. A drive system including said apparatus according to claim 7.

17. A drive system including said apparatus according to claim 8.

18. A drive system including said apparatus according to claim 9.

19. A displacement detection apparatus comprising means for combining a first beam and a second beam and light receiving means for receiving an interference beam formed by the combination of said first and second beams said combining means being provided with first to fourth diffraction gratings differing in phase by 90° each, said light receiving means being provided with first to fourth light receiving portions for individually receiving portions of said interference beam obtained through said first to fourth diffraction gratings.

20. A drive system including said apparatus according to claim 19.

21. A displacement detection apparatus comprising:

a beam combining member for combining a first beam and a second beam from an object, the information of relative displacement to which is to be detected, said beam combining member having a plurality of diffraction gratings differing in phase with each other; and a photodetecting member for detecting an interference beam formed by the combination of said first and second beams, said photodetecting member having a plurality of beam receiving areas each for receiving a beam portion from a corresponding one of said diffraction gratings, with the positional relationship between said beam combining member and said photodetecting member being substantially fixed.

22. A drive system including said apparatus according to claim 21.

\* \* \* \* \*

UNITED STATES PATENT AND TRADEMARK OFFICE
CERTIFICATE OF CORRECTION

PATENT NO. : 5,574,559
DATED : November 12, 1996
INVENTOR(S) : Kaneda et al.

It is certified that error appears in the above-identified patent and that said Letters Patent is hereby corrected as shown below:

COLUMN 1:

Line 8, "08/172,062," should read --08/172,052,--.

COLUMN 3:

Line 25, "R+1" should read --R+1,--.
Line 26, "grating G1" should read --grating G1,--.

COLUMN 4:

Line 7, "in" should read --in the--.

COLUMN 5:

Line 6, "3b2" should read --3b2.--.

COLUMN 6:

Line 39, "beam R1," should read --beam R-1,--.
Line 55, "$\{+2\pi x/P\}-\{2\pi x/P\}=4\pi x/P$" should read
--$\{+2\pi x/P\}-\{2\pi x/P\}=-4\pi x/P$--.

Signed and Sealed this

Twenty-second Day of June, 1999

Attest:

Q. TODD DICKINSON

Attesting Officer

Acting Commissioner of Patents and Trademarks